United States Patent [19]

Honkaniemi et al.

[11] Patent Number: 4,580,272
[45] Date of Patent: Apr. 1, 1986

[54] METHOD FOR CONTROLLING AND BALANCING THE POWER IN AN ELECTRIC FURNACE

[75] Inventors: Matti E. Honkaniemi; Teuvo M. Hyvärinen, both of Tornio; Paavo Raukko, Espoo, all of Finland

[73] Assignee: Outokumpu Oy, Helsinki, Finland

[21] Appl. No.: 482,431

[22] Filed: Jun. 3, 1983

[51] Int. Cl.⁴ ............................................. H05B 7/148
[52] U.S. Cl. ...................................................... 373/104
[58] Field of Search ................................. 373/104, 102

[56] References Cited

U.S. PATENT DOCUMENTS

| | | | |
|---|---|---|---|
| 3,536,817 | 10/1970 | Carroll et al. | 373/104 |
| 3,573,336 | 4/1971 | Ibach et al. | 373/104 |
| 4,296,269 | 10/1981 | Stewart et al. | 373/104 |
| 4,320,245 | 3/1982 | Gaydon et al. | 373/104 |

Primary Examiner—Vit W. Miska
Attorney, Agent, or Firm—Browdy and Neimark

[57] ABSTRACT

A method for controlling and balancing the power consumption in an electric smelting or heating furnace, in which power is fed into the furnace via at least two electrodes and in which the tips of the electrodes are maintained at the same level above the melt or at the same distance from the furnace cover throughout the process sequence. Power is controlled by adjusting the voltage between the furnace electrodes, the electrotechnical quantities of the furnace varying freely throughout the process sequence. Any disequilibrium due to the electrode structure or to changes in the furnace conditions is balanced out by adjusting the moving of furnace electrodes, corresponding to the wear of the electrodes, by using the quantities measured in the furnace and the short-term and long-term variations calculated with the aid of these quantities, and the linear functions with relation to time of the variations.

7 Claims, 2 Drawing Figures

METHOD FOR CONTROLLING AND BALANCING THE POWER IN AN ELECTRIC FURNACE

BACKGROUND OF THE INVENTION

1. Field of the Invention

The present invention relates to a method for controlling and balancing the power consumption in an electric smelting or a heating furnace, in which power is fed into the furnace via at least two electrodes and at the early stage equilibrium is established by moving the electrodes.

2. Description of the Prior Art

U.S. Pat. No. 4,296,269 of Stewart et al substantially corresponding to ZA Patent Application No. 773923 discloses an electric furnace control system which is based on the observation of the states present in the secondary circuit. In accordance with the system, selected values of the primary and the secondary circuits are measured and the results of the measurement are computer processed. The computer processing enhances the control of the furnace in such a way that the behavior of the inductances of the secondary circuits can be predicted on the basis of other changes occurring in the furnace. The obtained computer values are further applied to the furnace control devices in such a way that the conditions in the furnace can be maintained within predetermined limits by moving the electrodes, when necessary, either downwards or upwards.

The practical implementation of the control system according to U.S. Pat. No. 4,296,269 and ZA Patent Application No. 773923 requires that the secondary circuit inductances are predictable and maintained equal to each other and that, when using these inductance values, the determined resistance values are to be compared with predetermined approximate resistance values. In this case, since the power transmitted by the electrodes is greatly dependent on the resistance values used, which in the system according to U.S. Pat. No. 4,296,269 ZA Patent Application No. 773923 are largely dependent on the predetermined values, adjustments of the power required by the furnace are effected by moving the electrodes either downwards or upwards.

The power control of an electric furnace carried out by moving the electrodes is disadvantageous as regards the electrodes, since the electrodes are thereby subjected to great variations of temperature, among other things. When self-sintering co-called Söderberg electrodes are used, the distribution of temperature is crucial for the operation of an electrode. The Söderberg electrode paste is prepared by mixing a carbon-containing material and a tar-pitch bonding agent. Qualitatively the properties of the paste can be distributed into two parts, the upper side and the lower side of the sintering zone. The lower, sintered part can be regarded as a complete electrode, in which the physical properties of the solid carbon material are important considering the operation of the electrode. In the upper part the main requirement for the paste is good fluidity, since it is important that the paste flows at a moderate temperature and fills the mantle properly. In this case it is important with regard to the whole electrode to maintain both the level of the molten paste and the sintering zone within certain limits. The levels of these zones are primarily affected by the temperature. As regards the operation of the electrode, disadvantageous heights may cause problems, even the breaking of the electrodes into two.

SUMMARY OF THE INVENTION

The object of the present invention is to eliminate the disadvantages of the current art and to provide a method for controlling the power consumption in an electric furnace by adjusting the voltage between the electrodes and, in order to balance the power among the different electrodes, by adjusting the feed rate corresponding to the wear of the electrodes.

The invention provides a method of the character described above, which comprises feeding electric power into the furnace via at least two electrodes, establishing equilibrium at the initial stage by moving the electrodes, upon reaching the desired equilibrium, keeping the rate of feeding electrodes downwards constant or at zero, and controlling the power by adjusting the voltage between the electrodes by means of quantities measured in the electric furnace, whereby the impedances, reactances and resistances of the furnace are allowed to vary freely, when, at the limit of the desired power range, the limit of the current feed range is also reached, owing to changes in the power receiving capability of the electrodes and/or changes in the furnace conditions, effecting balancing by adjusting the feeding rate of each one of the electrodes, with the aim to maintain the electrode tips of each of the electrodes on the same level either above the melt or distanced from the furnace cover throughout the process sequence, in which case the variation diagram calculated on the basis of the quantities measured in the furnace and the mutual dependencies of these variations are utilized, and after a new feeding-in rate is established, again carrying out the power control by adjusting the voltage, and so forth, as long as an equilibrium can be maintained in this manner.

In accordance with the invention, the basic point of departure is that, for controlling the power intake of the furnace, the electrodes are not moved downwards and upwards, but the aim is to keep their tips in place, and the power is regulated by adjusting the voltage between the electrodes. However, since owing to the electrode manufacturing method, the electrodes wear unevenly, and since changes occurring in the furnace produce a situation in which the different electrodes are capable of receiving different currents and powers at different times, these changes must be balanced by a feeding of each of the electrodes at a varying feed speed into the furnace dependent upon consumption of the electrode. In the control and balancing system according to the invention, no attempt is made at any stage to make constant the electrotechnical parameters of the furnace, i.e. resistance R, inductance L and impedance Z, but they are allowed to vary freely according to the process sequence. In this case it is possible to minimize the movement of the electrodes, whereby the operation of the electrodes will be even and there will be no breaking of electrodes owing to mechanical movement. In addition, the maintenance requirement of the mechanical electrode devices is reduced, and without upward and downward electrode movement, seals will have less tendency to deteriorate and allow gases generated in the furnace to leak to the outside.

In order to carry out advantageously the electric furnace power control and balancing method according to the invention, the given limits for each one of the variables due to the specific furnace construction, such as current and apparent power, as regards power feed are also observed. When the given limits of the variables are exceeded, in which case the changes which have occurred have been greater than the restrictions due to furnace construction and the adjustment margins of the devices have been exceeded, the relative positions of the electrodes are adjusted in such a way that a new equilibrium is obtained, the position of the electrodes being determined by some method known per se, and new short-term and long-term variation diagrams are followed. Even though, in order to carry out the method according to the invention advantageously, electrodes are fed into the furnace throughout the process sequence, it is also possible in connection with the forming of an electrode equilibrium to move an electrode or electrodes upwards, if it is advantageous considering, for example, the furnace conditions.

The feeding of electrodes into the furnace, related to the control and balancing method according to the invention, and the control of this feeding, can be carried out either automatically or manually.

The use of the control and balancing method according to the invention is not limited only to completely closed electric furnaces, but advantages are gained using the method also in open or semi-open electric furnaces. Particular advantages are gained using the method according to the invention in completely closed immersion arc furnaces, from which melt is discharged intermittently and the exhaust gases of which are used for maintaining energy economy outside the furnace, in which case the uniform generation of gases achieved by the control and balancing method according to the invention is important. Such immersion arc furnace processes include the ferrochromium crude iron and ferromanganese processes. However, the method can also be applied to electric furnaces from which melt is discharged continuously.

The power control according to the invention by controlling the coil switch, which is a switch with which different second any windings of the supply transformer are switched on in order to obtain the desired transformer ratio, can alone be a furnace control method and does not necessarily require a balancing method if, for example, the different wear of also the different electrodes due to their structure can be prevented. Respectively, the balancing of also the electrodes can also be used alone in connection with some other power control method, even though it is preferably used in connection with coil switch control.

One preferred embodiment method of the invention is illustrated in greater detail below with reference to the accompanying drawings.

The accompanying drawings illustrate the operating principle of the control method according to the invention.

DESCRIPTION OF THE PREFERRED EMBODIMENT

For the control method according to the invention, the following quantities are measured in the furnace:
A. Phase currents ($I_p$) of the transformer primary circuit
B. Phase currents ($I_s$) of the transformer secondary circuit
C. Electrode currents ($I_E$)
D. Phase-specific apparent power ($S_p$) of transformer
E. Effective phase-specific power input ($P_s$) into the furnace.

The external restrictions of the control according to the invention consist only of the allowed maximum powers and currents of the furnace transformer and the maximum currents of the electrode system and the conductor bars supplying the high voltage required by the furnace. The control is as follows: On the basis of measured quantities A–E the controller first checks the set limits due to furnace structure, which must not be exceeded, and sets the voltage at a level at which these limits will not be exceeded. If these furnace structure limits have not been exceeded, the controller calculates from the phase-specific effective inputs $P_s$ the sum effective input $\Sigma P_s$ into the furnace and compares it with the set values and carries out the necessary increasing or decreasing of voltage, if the obtained result of measurement $\Sigma P_s$ is outside the set range.

The invention is described below in greater detail with reference to FIG. 1 which depicts curves related to the description of the control method.

Figure 1:
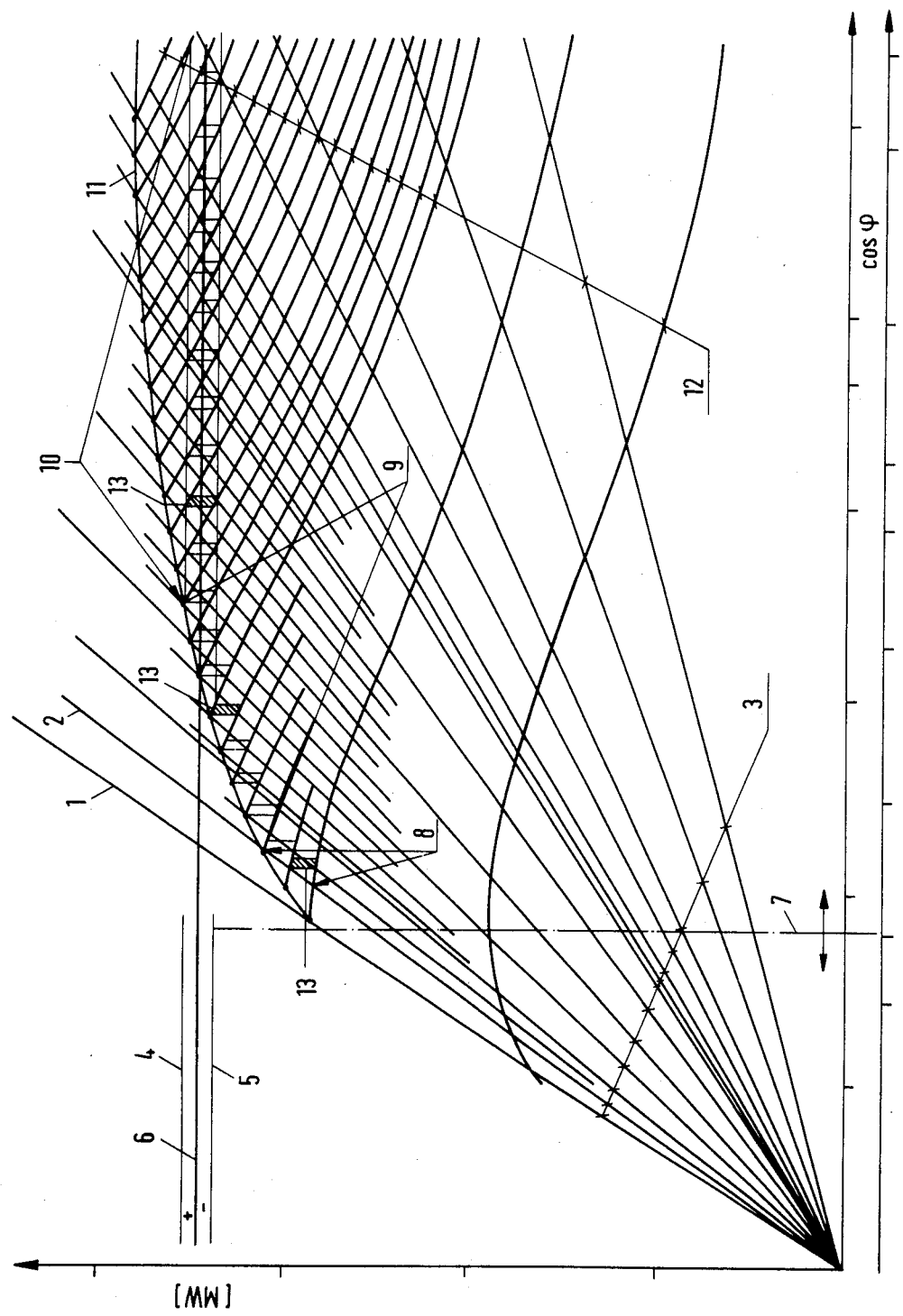
FIG. 1 illustrates graphically the ranges through which the furnace is initially heated and thereafter kept heated.

FIG. 1 shows graphically the operating principles of the control method according to the invention, using a symmetrical three-phase load, as a function of the phase resistance R and the phase angle $\phi$, utilizing, for the purpose of making the figure clear, the constant reactance value, which is, however, not attained in practice, and assuming that the limitations due to furnace structure for the phase-specific quantities have not been exceeded. Numeral 1 indicates the maximum secondary current of the furnace transformer and numeral 2 the maximum electrode current from the transformer to the electrodes. The electrode currents in general are indicated by numeral 3. The lines 4 and 5 indicate the upper and lower limits of the desired furnace power 6, preset in the controller, and the vertical dashed line 7 indicates the boundary between the operating range practicable in the control method according to the invention and the nonrecommended operating range. The practicable operating range is to the right of the dashed line 7. The operating range is divided into three parts: range 8, within which the maximum electrode current 2 limits the furnace power consumption, range 9, within which the transformer primary current 11 limits the furnace power consumption, and range 10, within which the controller determines the furnace power consumption. Within range 10 the upper limit 4 of the desired furnace power is constantly lower than the maximum allowed load of the transformer. The set of curves 12 represents the various voltage steps of the transformer. The diagonally shaded areas 13 within the ranges 8, 9 and 10 illustrate the various control sequences when the method according to the invention is applied.

Thus, the sum effective power $\Sigma P_s$ calculated by the controller from the phase-specific effective powers $P_s$ is discussed in accordance with the figure. Within range 8, within which the desired furnace power 6 has not yet been attained, owing to the maximum electrode current 2, the controller effects the increasing of the voltage by means of a coil switch for switching to different secondary windings of the supply transformer to the next voltage step 12 during the course of control sequence 13. The same occurs within range 9, and it is only at the end of this range that the set desired upper limit 4 of furnace power consumption is attained, owing to the maximum load 11 of the transformer. Within range 10 during control sequence 13, the coil switch effects a decreasing or increasing of the voltage to that voltage step 12 at which the desired power 6 within the set limits 4 and 5 is obtained in the furnace. Thus the impedance (and at the same time the resistance) of the furnace may vary freely during the furnace operation.

It should be noted that control of the furnace can be carried out only after obtaining a certain power level, whereby line 7 of FIG. 1 illustrates the limit above which power can be controlled. Furthermore, the right hand side of line 7 also shows certain limitations on the basis of which the control area is divided into different parts illustrated by reference numerals 8–10.

Reference number 13 illustrates the periods of control where the power consumption of the furnace is most advantageous taking into account existing limitations. For example in the range 10 which includes a plurality of advantageous control periods 13, the furnace power is preferably controlled with the coil switch to that voltage level 12 with which such an advantageous control period can be obtained. Due to changes in the furnace conditions the power may increase or decrease and escape from the advantageous control period 13, whereby by changing the voltage step 12 the power can be returned to the desired range while using another control period 13.

The variable X is the structural reactance which is dependent upon the furnace construction and R is the phase resistance dependent upon the furnace structure and the charge. The dependence $$\cos\phi = \sqrt{\frac{R}{X^2 + R^2}},$$

can be obtained from these variables.

Figure 2:
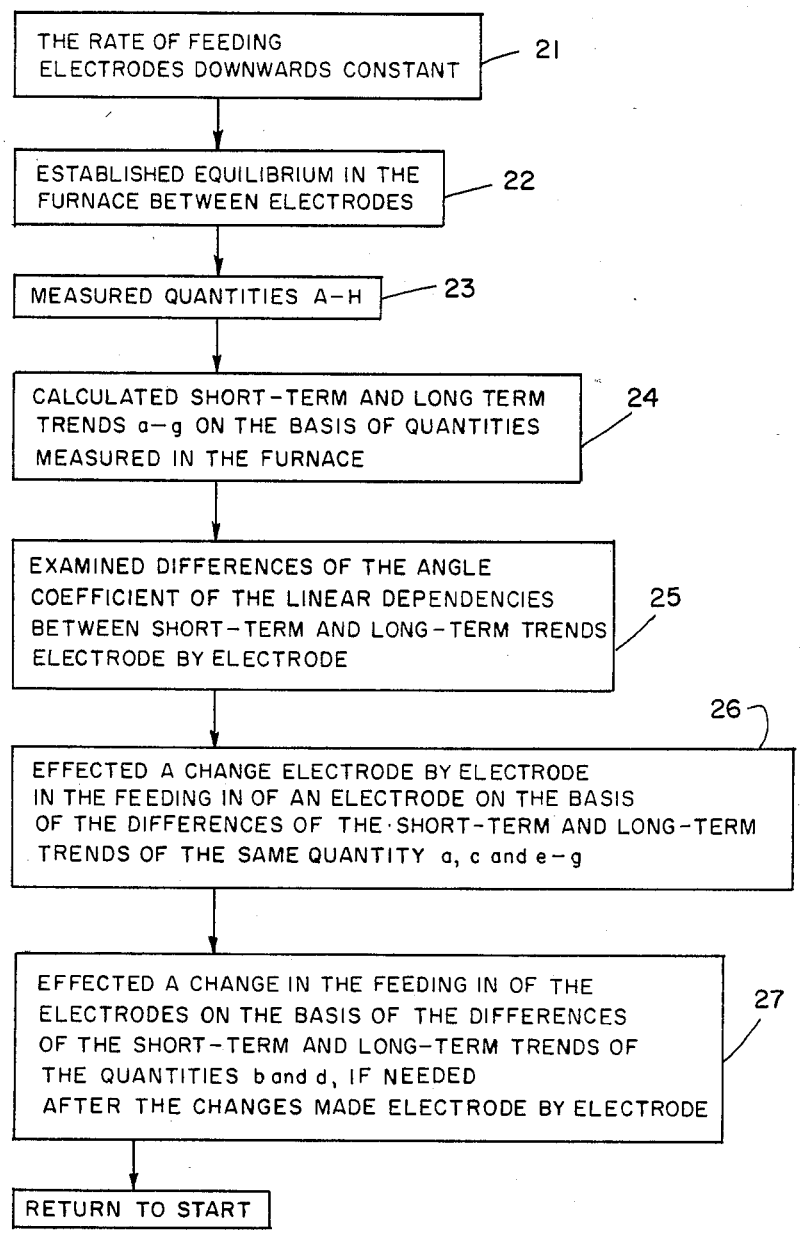
FIG. 2 illustrates in the form of a flow chart the steps of the present invention.

In an advantageous application of the control method according to the invention, illustrated in the flow chart of FIG. 2, in steps 21–27, taking into consideration the changes occurring in the different electrodes as regards their capability of receiving power, the power to each of the electrodes of the electric furnace is balanced by adjusting the feeding in of the electrodes in step 21. Balancing means, here a situation in which the position of the electrodes as regards their tips is measured by some method known in itself, and the balance between the electrodes is obtained by setting the tips of the electrodes at the same level above the melt or at the same distance from the furnace cover. Thus an equilibrium in step 22 is obtained in the furnace, and the aim is to maintain this equilibrium. What is most important in the balancing is that changes in the moving of the electrodes must be made sufficiently early, before the changes in the current distribution have caused changes in the furnace temperature distribution.

When we observe the changes caused by uneven wear of the electrodes or changes in deposits in the furnace, the following facts can be noted:
Changes occur in the electrode currents $I_E$
Changes occur in the electrode-specific effective powers $P_s$
Changes occur in the electrode-specific reactive powers $Q_s$
Changes occur in the voltage $U_E$ between the electrode and the bottom.

The change in the position of an electrode, i.e. the wear of the electrode, can be observed from the above-mentioned changes in the quantities. In order to balance the powers by the method according to the invention, the following quantities are measured in the furnace in step 23 in addition to the quantities measured in order to adjust the power:

F. Phase-specific reactive input power $Q_s$ into the furnace
G. Voltage $U_E$ between the electrodes and the bottom
H. Voltage U between the electrodes The measuring principle according to the invention for balancing the powers among the electrodes is as follows:

The different quantities are measured continuously, as arithmetic means, in sequences of 10 seconds to 15 minutes. Thereafter, both short-term trends, 0.5 hours to 96 hours, and long-term trends, 2 hours to 60 days, i.e. variation diagrams, are calculated on the basis of the quantities measured. The measuring sequence and the lengths of the trends can be selected separately for each quantity. The trends or variations are calculated by means of mathematical methods known in themselves, such as reagent analysis, using a calculator or a computer.

Both short-term and long-term trends are calculated for the following quantities:
a Difference between the phase-specific effective power $P_s$ and the mean of the sum effective power $$\frac{\Sigma P_s}{n}$$

for each measuring sequence, where n is the number of the electrodes.
b Sum effective power $\Sigma P_s$
c Difference between the phase-specific reactive powers $Q_s$ and the mean of the sum reactive power $$\frac{\Sigma Q_s}{n}$$

for each measuring sequence, where n is the number of electrodes.
d Sum reactive power $\Sigma Q_s$.
e Phase currents $I_p$ and $I_s$ of the primary and secondary circuits of the transformer.
f Electrode currents $I_E$.
g Voltage $U_E$ between the electrodes and the bottom, subtracted from the voltage U between the electrodes divided by $\sqrt{3}$, i.e.

$$\frac{U}{\sqrt{3}} - U_E.$$

Furthermore, linear dependencies are dependency with relation to time, obtained by mathematical analysis from the measured results, whereby the function is drawn as linear is calculated for the trends (a–g) calculated in step 24 on the basis of the control and balancing method according to the invention, and the angle coefficients of the linear dependency which are the coefficients indicating the inclination of the linear dependency with respect to the horizontal, these coefficients defining the tangent of the angle of inclination, are thereafter examined in step 25. If the angle coefficients of the short-time trend and the long-time trend of the same quantity (a, c and e–g) deviate from each other, a change is effected in each of the electrodes in step 26 in the feeding in of an electrode, within the limitations of furnace structure such as in the electrode feed system. The adjustment of the feeding in of all the electrodes is effected on the basis of the differences between the angle coefficients of the linear dependencies of the short-term and the long-term trends of the sum trends (a and d), in step 27 taking into consideration, however, the effect of the adjustments made for each electrode.

What is claimed is:

1. A method for controlling and balancing the power consumption in an electric smelting or heating furnace, comprising the steps of supplying electric power into the furnace via at least two electrodes, establishing equilibrium of power and current used at the initial stage by moving the electrodes, upon reaching the desired equilibrium, keeping the rate of feeding electrodes downwards constant or at zero, and controlling the power consumption by adjusting the voltage between the electrodes by means of quantities measured in the electric furnace, whereby the impedances, reactance and resistance of the furnace are allowed to vary freely, when, at the limit of the desired power range, the limit of the current feed range is also reached, owing to any changes in the power receiving capability of the electrodes and changes in the furnace conditions, effecting balancing by adjusting the feeding rate of each of the electrodes, with the aim to maintain the electrode tips of each of the electrodes on the same level relative to the furnace and contents throughout the process sequence, in which case the trends of variation calculated on the basis of the quantities measured in the furnace and the mutual dependencies of these trends upon each other are utilized, and after a new feeding-in rate, again carrying out the power control by adjusting the voltage, and repeating aforementioned steps as long as an equilibrium can be maintained in this manner.

2. A method according to claim 1, wherein the voltage control is carried out by controlling the switching between a plurality of secondary windings of a supply transformer.

3. A method according to claim 1, wherein in order to control and balance the power, the phase currents $I_p$ and $I_s$ of the primary and secondary circuits of the furnace transformer, the electrode currents $I_E$, the phase-specific apparent power $S_p$ of the transformer, the phase-specific effective input power $P_s$ into the furnace, the phase-specific reactive input power $Q_s$ into the furnace, the voltage $U_E$ between the electrodes and the bottom, and the voltage U between the electrodes are measured.

4. A method according to any one of claims 1, 2 or 3, wherein with the aid of the quantities measured in the furnace, both short-term and long-term variation trends are calculated separately for each quantity processed, and linear dependencies are calculated for said trends, the differences between these dependencies and the short-term and long-term trends of the same quantity being used for determining the rate of feeding the electrodes into the furnace.

5. A method according to claim 4, wherein the length of the short-term trend is between 0.5 and 96 hours.

6. A method according to claim 4, wherein the length of the long-term trend is between 2 hours and 60 days.

7. A method according to claim 1, wherein the quantities measured in the furnace are measured continuously as arithmetic mean values, the length of the measuring sequence being between 10 seconds and 15 minutes.

* * * * *